United States Patent
Ramb

(10) Patent No.: US 8,920,114 B2
(45) Date of Patent: Dec. 30, 2014

(54) TURBOCHARGER WITH VARIABLE TURBINE GEOMETRY

(75) Inventor: Thomas Ramb, Worms (DE)

(73) Assignee: BorgWarner Inc., Auburn Hills, MI (US)

( * ) Notice: Subject to any disclaimer, the term of this patent is extended or adjusted under 35 U.S.C. 154(b) by 396 days.

(21) Appl. No.: 13/510,016

(22) PCT Filed: Nov. 10, 2010

(86) PCT No.: PCT/US2010/056151
§ 371 (c)(1),
(2), (4) Date: May 16, 2012

(87) PCT Pub. No.: WO2011/066102
PCT Pub. Date: Jun. 3, 2011

(65) Prior Publication Data
US 2012/0251302 A1  Oct. 4, 2012

(30) Foreign Application Priority Data
Nov. 27, 2009  (DE) .......................... 10 2009 056 046

(51) Int. Cl.
F01D 1/06  (2006.01)
F01D 17/16  (2006.01)
F02C 6/12  (2006.01)
F02B 37/24  (2006.01)

(52) U.S. Cl.
CPC ............... F01D 17/165 (2013.01); F02C 6/12 (2013.01); F05D 2220/40 (2013.01); F02B 37/24 (2013.01); Y02T 10/144 (2013.01)
USPC .......................... 415/160; 415/164; 415/166

(58) Field of Classification Search
USPC .......................... 415/160, 163, 164, 165, 166
See application file for complete search history.

(56) References Cited

U.S. PATENT DOCUMENTS

| | | | | |
|---|---|---|---|---|
| 5,207,565 | A * | 5/1993 | Roessler | 415/202 |
| 6,623,240 | B2 * | 9/2003 | Ertl et al. | 415/163 |
| 7,010,915 | B2 * | 3/2006 | Stilgenbauer | 415/160 |
| 2009/0142185 | A1 * | 6/2009 | Fath et al. | 415/159 |
| 2009/0249784 | A1 * | 10/2009 | Hamada | 415/203 |

* cited by examiner

*Primary Examiner* — Igor Kershteyn
(74) *Attorney, Agent, or Firm* — William G. Anderson; Stephan A. Pendorf; Patent Central LLC

(57) ABSTRACT

A turbocharger (15) with variable turbine geometry
having a blade bearing ring arrangement (1) which has a blade bearing ring (2) and a disk (3) which can be fixed to the blade bearing ring (2) to form a flow duct (4);
having a spacer device (5) which is arranged between the blade bearing ring (2) and the disk (3) to set a defined width (B) of the flow duct (4), wherein
the spacer device (5) is designed as a guide ring (6) which has spacer profiles (7) whose height (H) corresponds to the width (B) of the flow duct (4).

20 Claims, 5 Drawing Sheets

TURBOCHARGER WITH VARIABLE TURBINE GEOMETRY

Figure 1:
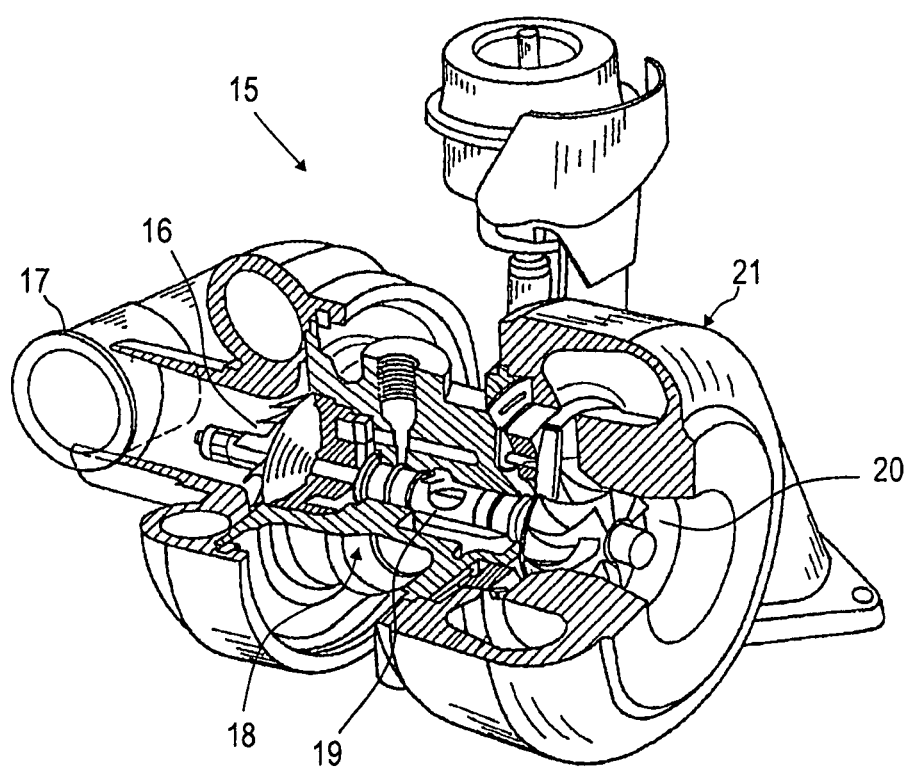

The invention relates to a turbocharger with variable turbine geometry (VTG).

The VTG cartridge of a turbocharger of said type known from EP-A-1 236 866 has a guide apparatus with blades and levers and a turbine-housing-side disk. The fastening of the disk to a blade bearing ring of a blade bearing arrangement takes place in generic turbochargers by means of screws or welding. A spacer device is provided in order to be able to set a defined width for the flow duct which is formed between the blade bearing ring and the disk and in which the blades of the VTG are situated. In the prior art, said spacer device is constructed from spacer sleeves, stepped bolts or welded pins. Cast spacer elements are also known.

However, said known arrangements have the disadvantage of having a relatively large number of components, which makes production and assembly laborious. For example, if threaded pins are provided as a spacer device, it is necessary for this purpose to carry out assembly steps for the provision of bores, threads and an associated outer diameter enlargement of the blade bearing ring and disk. Here, the assembly pins, at least 3 such pins, must be mounted in the guide apparatus, and said threaded pins must subsequently be welded to the disk at the spacing dimension and measured for distortion.

It is therefore an object of the present invention to create a turbocharger in which it is possible to reduce the number of components thereof and to technically simplify both the production and also assembly steps of said components while maintaining compact dimensions.

The particular advantages of the turbocharger according to the invention consequently include the attainment of a reduction in the number of required components, a reduction in the number of machining steps and a reduction in assembly expenditure. It is also possible to reduce the outer diameter of the cartridge, which has an advantageous effect on the material amount and the required installation space.

Furthermore, a streamlined design results in improved gas dynamics within the guide apparatus and therefore improved thermodynamics of the entire turbocharger.

Finally, the advantages include an improvement in stability of the duct of the rotatable blades as a result of the profiled shape and number of spacer webs and also of the non-assembled design in relation to the above-explained known cartridge, in which pins are used as a spacer device.

The positioning of the guide ring according to the invention as a spacer device with respect to the ring of rotatable blades requires merely the provision of a positioning groove on the outer diameter of the blade bearing ring.

As an assembly step, it is necessary merely for the guide ring to be plugged onto the disk and the blade bearing ring.

The guide ring preferably has two ring parts which are preferably of circular-ring-shaped design. Said ring parts are connected to one another by means of the profile parts, with it being possible for said arrangement to be formed as a cast part or sheet metal part.

The profile parts which provide the support of the disk and blade bearing ring are preferably of streamlined design. The profile parts can therefore deflect the flow into the blade ring of the variable turbine geometry in a targeted fashion. The ring parts of the guide ring may, as already explained in the introduction, be plugged onto the blade bearing ring or the disk. Here, the profile parts provide the axial positioning of the components while the ring parts provide the radial support.

In a further embodiment, it is possible for the turbine-housing-side ring to be formed as an integrated disk. In said embodiment, the guide ring is preferably formed as a cast part which has, as a ring part, the disk which is integrally connected to the profile parts and to the second ring part.

It is also possible for the bearing-housing-side ring to be provided with a flange in order to be able to clamp the entire cartridge between the turbine housing and the bearing housing. The sealing between the turbine housing and the cartridge (sealing of exhaust-gas pressure upstream of the guide ring and exhaust-gas pressure downstream of the rotatable blades) is provided here preferably by means of an additional seal. If the guide ring is provided with an additional flange, the design as a cast part is preferable.

It is also preferably possible for the ring part of the guide ring to be provided with a positioning aid, preferably in the form of a bent-out portion. Said positioning aid may be placed in engagement with a suitable groove in the blade bearing ring. The disk may likewise have a groove of said type to provide rotationally fixed positioning.

In all of the above-described design variants, the profile parts project radially into the inner annular chamber delimited by the ring parts, such that, in the assembled state of the cartridge, said profile parts project into the space between the blades of the variable turbine geometry such that they can deflect the flow to the rotatable blades and thereby improve the flow introduction.

If the guide ring is produced by shape-constrained production processes (casting processes), the profiles may be designed such that subsequent machining is possible in one chucking process without burrs and without further steps. As a result, minimal waste material is produced.

It is alternatively possible to produce the guide ring by means of shaping production processes (deformation and punching). Here, the basic shape is generated by means of deformation processes such as bending, pressing and deep drawing. The profiles are generated by punching out and deforming the profiles. The material usage can thereby be reduced to a minimum. Here, the production process which is suited to the design of the guide ring ensures high production rates with low unit costs. No additional design features such as bores or threads, or the production thereof, is required in the surrounding components.

Figure 2:
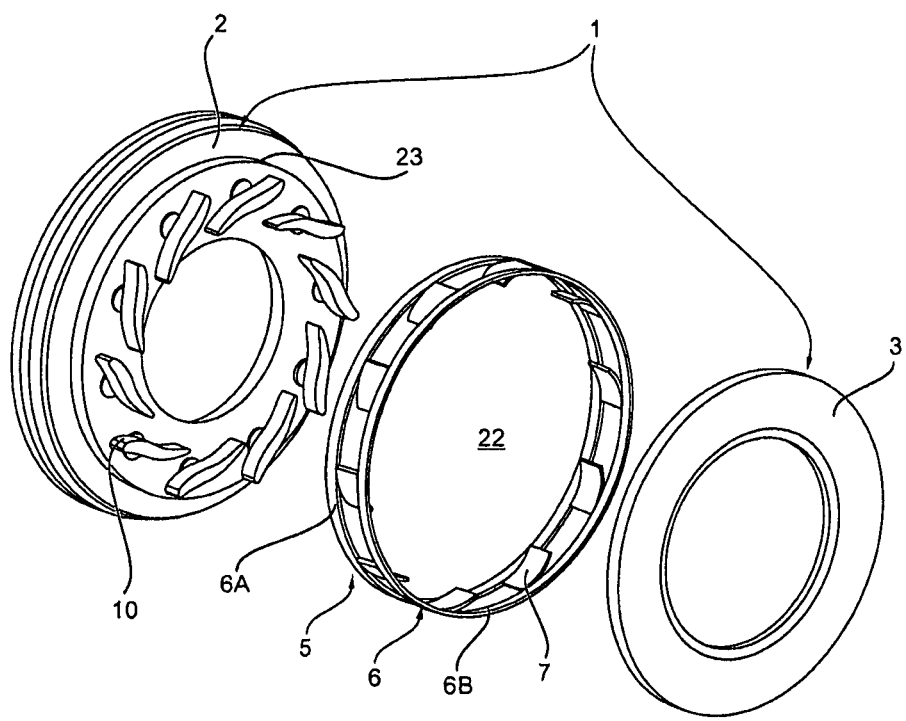
Figure 3:
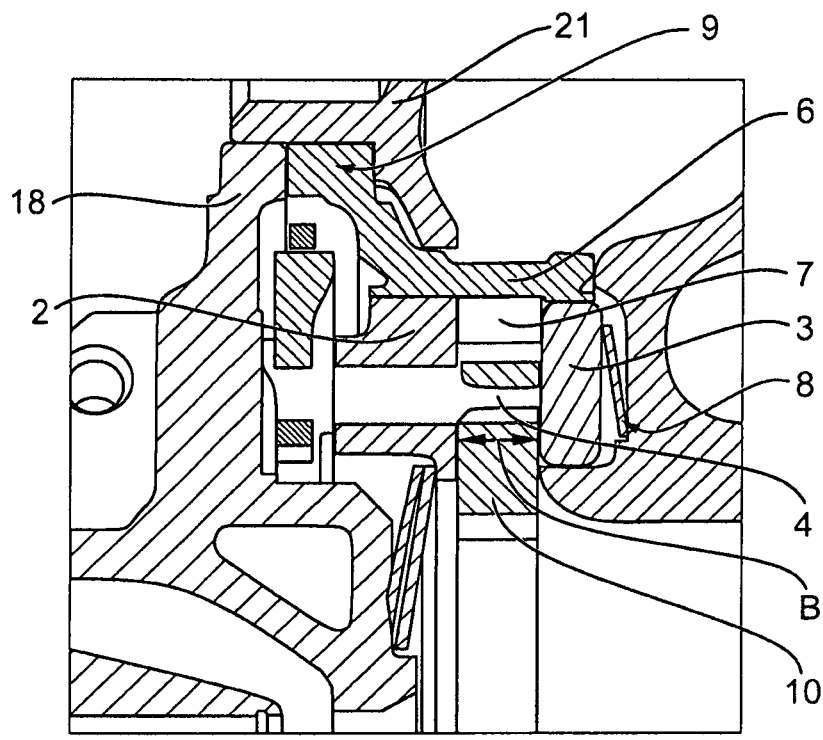
Figure 4:
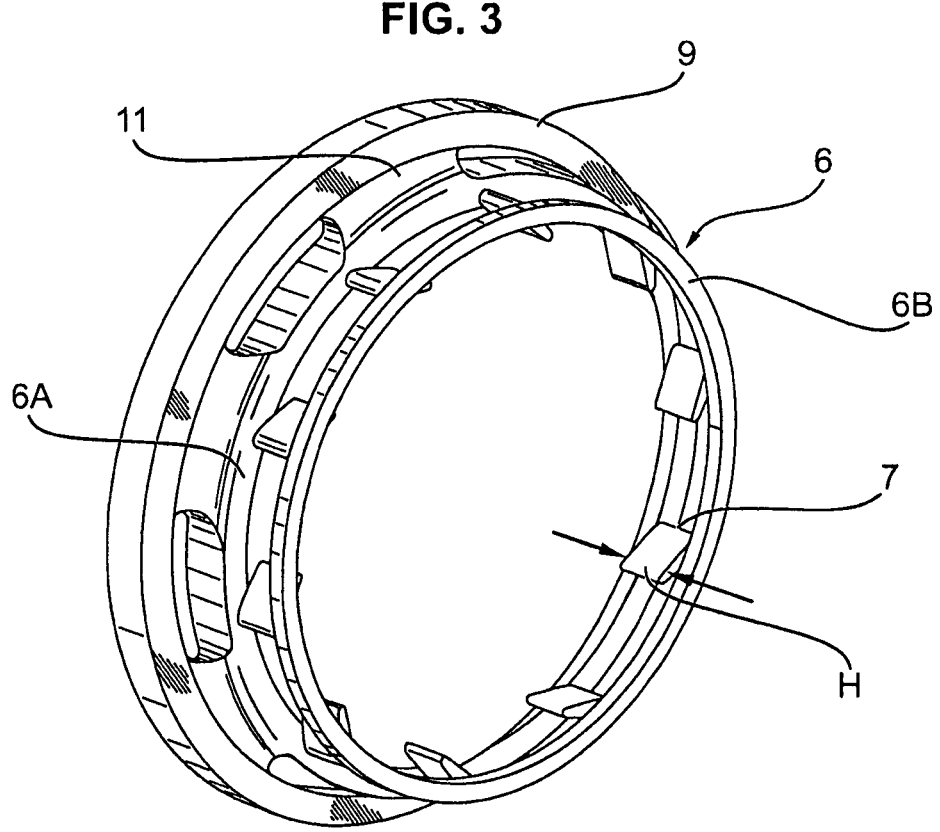
Figure 5:
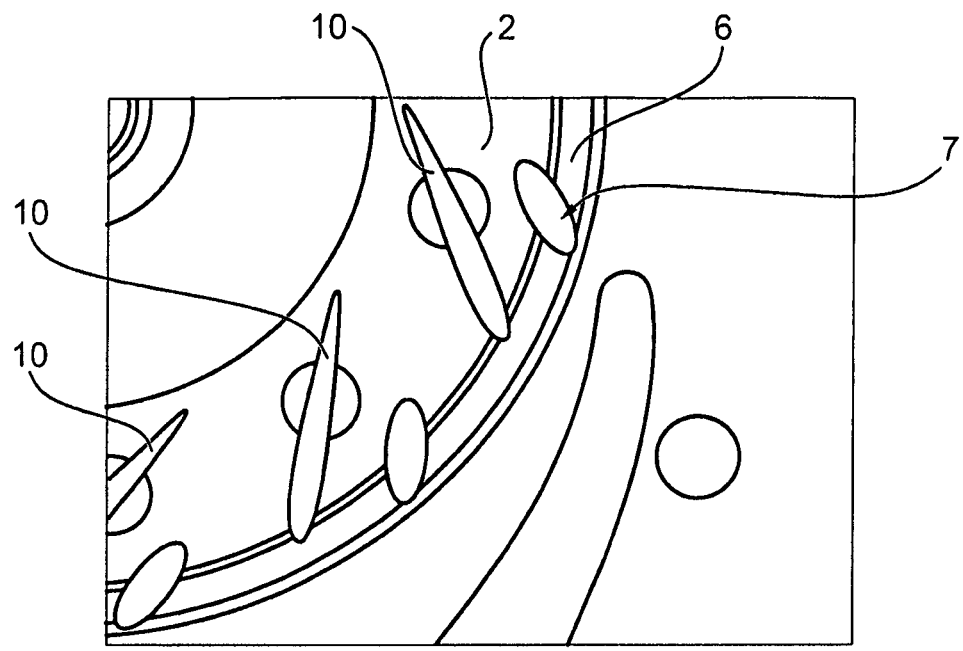
Figure 6:
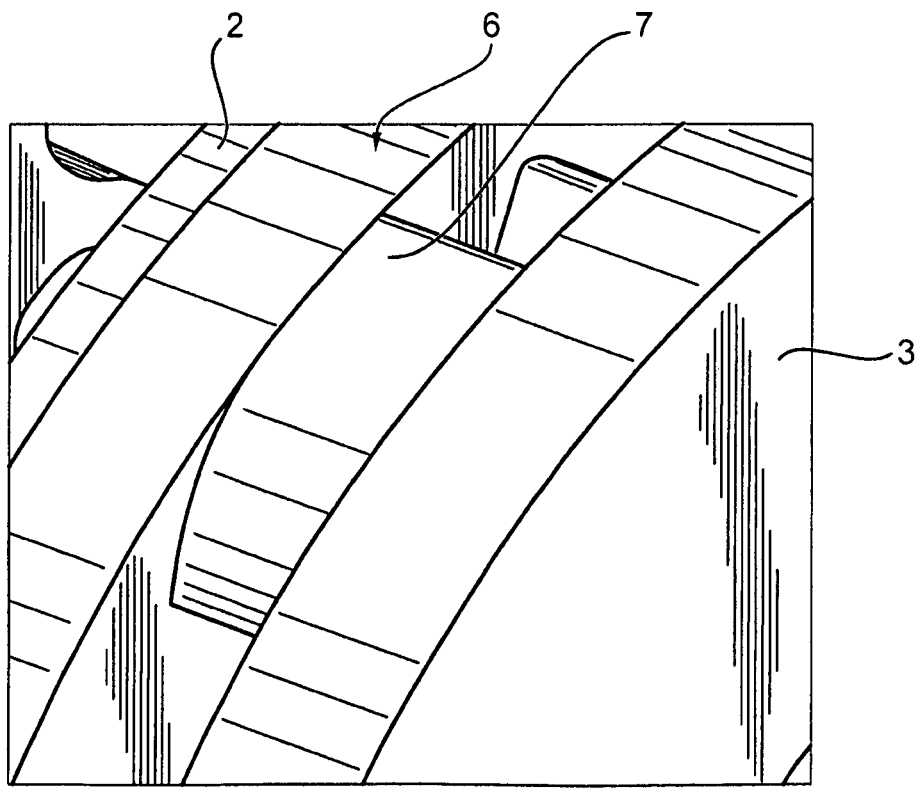
Figure 7:
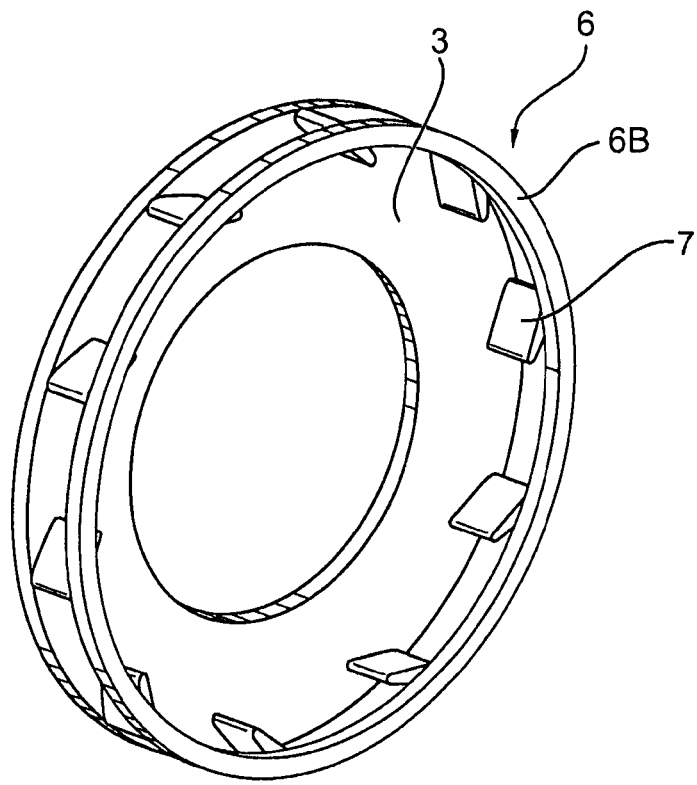
Figure 8:
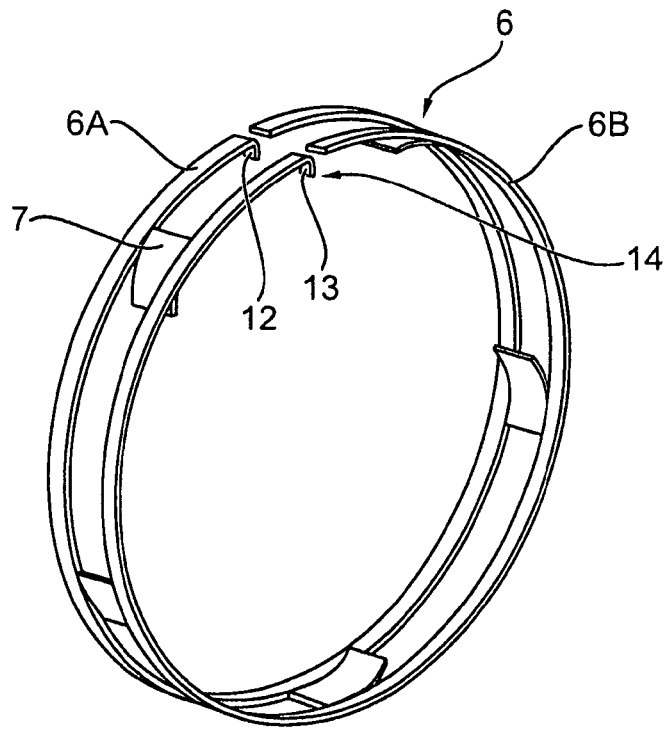

Further details, features and advantages of the invention will emerge from the following description of exemplary embodiments on the basis of the drawing, in which:

FIG. 1 shows a perspective illustration of a turbocharger according to the invention, FIG. 2 shows a blade bearing ring arrangement according to the invention in a perspective exploded illustration, FIG. 3 shows a sectional partial view of a second embodiment of a turbocharger according to the invention, or of a blade bearing ring according to the invention, FIG. 4 shows a perspective illustration of the guide ring used in the embodiment according to FIG. 3, FIG. 5 shows a plan view of a part of the first embodiment of the blade bearing ring arrangement according to the invention, or of the turbocharger according to the invention, FIG. 6 shows a partial view of a further embodiment of the guide ring according to the invention, FIG. 7 shows an illustration, corresponding to FIG. 4, of an alternative embodiment of the guide ring, and FIG. 8 shows an illustration, corresponding to FIG. 7, of a further embodiment of the guide ring according to the invention.

Since a complete explanation of all the design details of a turbocharger with variable turbine geometry is not required for the following description of the design principles according to the invention, only the basic components of a turbocharger 15 according to the invention are labeled in FIG. 1, which turbocharger, as is conventional, has a compressor wheel 16 in a compressor housing 17, a bearing housing 18 with the requited bearings for a shaft 19, and a turbine wheel 20 in a turbine housing 21. Said turbocharger also has a so-called VTG cartridge which comprises rotatable blades and levers and a turbine-housing-side disk and also a blade bearing ring and an adjusting ring. Said components will be explained in detail on the basis of the following figures. The other parts of a turbocharger of said type are not required for the explanation of the present invention in order to fully understand its principles, but are self-evidently likewise provided in the turbocharger 15 according to the invention.

FIG. 2 illustrates a blade bearing ring arrangement 1 according to the invention in an exploded illustration in order to be able to better explain its construction.

The blade bearing ring arrangement 1 has a blade bearing ring 2 in which blades are rotatably mounted, of which one blade is denoted, representatively for all of the blades, by the reference numeral 10.

Furthermore, the blade bearing ring arrangement 1 has a disk 3. To be able to form a flow duct 4 (which can be seen from FIG. 3) for the blades 10, which flow duct 4 has a defined width B (see likewise FIG. 4), the blade bearing ring arrangement 1 is provided with a spacer device 5 which is designed as a guide ring 6. As shown in FIG. 2, said guide ring 6 has two ring parts 6A and 6B which are arranged spaced apart from one another and which are preferably of circular-ring-shaped design. Provided between the ring parts 6A and 6B is a multiplicity of profile parts, of which one profile part is denoted, representatively for all of the profile parts, by the reference numeral 7. In the example, a total of ten profile parts 7 are provided between the ring parts 6A and 6B. As shown in FIG. 2, the ring parts 6A and 6B are connected to one another by means of the profile parts 7. The profile parts 7 are designed as streamlined guide profiles, as can be seen for example from the plan view of FIG. 5.

Here, FIG. 2 shows that the profile parts 7 are arranged and designed so as to project into the interior space 2 delimited by the ring parts 6A and 6B, such that in the assembled state, as can likewise be seen for example from FIG. 5, said profile parts project into regions between the blades 10 and can thereby deflect the exhaust-gas flow into the blade intermediate spaces of the guide apparatus in a targeted fashion.

In the embodiment of the blade bearing ring arrangement 1 according to the invention illustrated in FIG. 2, the guide ring 6 can be plugged onto the blade bearing ring 2 and the disk 3. For this purpose, the blade bearing ring 2 has an axial shoulder or a circumferential groove and the disk 3 can be plugged with its outer diameter into the ring part 6B of the guide ring 6. FIGS. 3 and 4 show a second embodiment of the blade bearing ring 1 according to the invention or of the turbocharger 15 according to the invention.

As can be seen from a juxtaposition of FIGS. 3 and 4, the guide ring 6 again has two ring parts 6A and 6B which are connected to one another by means of the profile parts 7. In this embodiment, the guide ring 6 is also provided with a flange 9 whose outer diameter is greater than the outer diameter of the ring parts 6A and 6B. Said flange 9 is for example connected by means of webs 11 to the ring part 6A. This embodiment of the guide ring 6 is preferably a single-piece cast part.

FIG. 3 shows the installed state of the guide ring 6, which is clamped by means of its flange 9 between the bearing housing 18 and the turbine housing 21. FIG. 3 also shows that the width B of the flow duct 4 is determined by the height H of the profile parts 7 indicated in FIG. 4. Furthermore, the illustration of FIG. 3 shows that, in this embodiment, a seal 8 is preferably provided between the disk 3 and the turbine housing 21.

As already explained above, the plan view of FIG. 5 shows a possible streamlined shape of the profile parts 7, which in the installed state, on account of their alignment, project into a region between the blades 10 and can thereby supply the exhaust-gas flow to the rotatable blades in a targeted fashion.

FIG. 6 shows an embodiment of a cartridge with a guide ring 6 in the form of a sheet-metal guide ring.

FIG. 7 shows a further alternative embodiment of the guide ring 6 in which the ring part 6B is formed by the disk 3. The disk 3 is in turn connected via the profile parts 7 to the ring part 6A, as can be seen from the illustration of FIG. 7. This embodiment is preferably formed as a cast part.

In contrast, FIG. 8 shows an embodiment of the guide ring 6 according to the invention which is produced by shaping production processes. Said guide ring 6 corresponds substantially to the embodiment according to FIG. 2, but here, is additionally provided with positioning aids in the form of bent-out portions 12 and 13 which engage into matching cutouts or grooves (not illustrated in FIG. 8) in the blade bearing ring 2 or in the disk 3 when the guide ring 6 is assembled. In the case of the disk 3, the cutout serves as an additional anti-twist facility.

In all of the above-described embodiments, corresponding parts are provided in each case with the same reference numerals.

Furthermore, in addition to the above written disclosure of the invention, reference is hereby explicitly made to the diagrammatic illustration thereof in FIGS. 1 to 8.

LIST OF REFERENCE NUMERALS

1 Blade bearing ring arrangement
2 Blade bearing ring
3 Disk
4 Flow duct
5 Spacer device
6 Guide ring
6A, 6B Ring parts
7 Spacer profiles
8 Seal
9 Flange/collar
10 Blade
11 Webs
12 Bent-out portion
13 Bent-out portion
14 Positioning aid
15 Turbocharger
16 Compressor wheel
17 Compressor housing
18 Bearing housing
19 Shaft
20 Turbine wheel
21 Turbine housing
22 Interior space
23 Shoulder or circumferential groove

The invention claimed is:
1. A turbocharger (15) with variable turbine geometry having a blade bearing ring arrangement (1) which has a blade bearing ring (2) and a disk (3) which can be fixed to the blade bearing ring (2) to form a flow duct (4), and having a spacer device (5) which is arranged between the blade bearing ring (2) and the disk (3) to set a defined width (B) of the flow duct (4), wherein the spacer device (5) is designed as a guide ring (6) which has spacer profiles (7) whose height (H) corresponds to the width (B) of the flow duct (4).

2. The turbocharger as claimed in claim 1, wherein the guide ring (6) has two ring parts (6A, 6B) which are arranged spaced apart and between which the spacer profiles (7).

3. The turbocharger as claimed in claim 2, wherein the ring parts (6A, 6B) are connected to one another by means of the spacer profiles (7).

4. The turbocharger as claimed in claim 2, wherein one ring part (6B) is formed by the disk (3).

5. The turbocharger as claimed in claim 1, wherein the profile parts (7) have a streamlined profile.

6. The turbocharger as claimed in claim 1, wherein the profile parts (7) project into an interior space (22) of the guide ring (6).

7. The turbocharger as claimed in claim 1, wherein the blade bearing ring (2) has an axial shoulder or circumferential groove (23) onto which the guide ring (6) can be plugged.

8. The turbocharger as claimed in claim 1, wherein the guide ring (6) can be plugged with its ring part (6B) onto the outer diameter of the disk (3).

9. The turbocharger as claimed in claim 1, wherein the guide ring (6) is provided with a flange (9) for clamping between the bearing housing (18) and the turbine housing (21).

10. The turbocharger as claimed in claim 9, wherein the guide ring (6) is a cast part.

11. The turbocharger as claimed in claim 1, wherein the guide ring (6) is provided with a positioning aid (14).

12. A blade bearing ring arrangement (1) for a turbocharger with variable geometry, having a blade bearing ring (2) and a disk (3) which can be fixed to the blade bearing ring (2) to form a flow duct (4), and having a spacer device (5) which is arranged between the blade bearing ring (2) and the disk (3) to set a defined width (B) of the flow duct (4), wherein the spacer device (5) is designed as a guide ring (6) which has spacer profiles (7) whose height (H) corresponds to the width (B) of the flow duct (4).

13. The blade bearing ring arrangement as claimed in claim 12, wherein the guide ring (6) has two ring parts (6A, 6B) which are arranged spaced apart and between which the spacer profiles (7).

14. The blade bearing ring arrangement as claimed in claim 13, wherein the ring parts (6A, 6B) are connected to one another by means of the spacer profiles (7).

15. The blade bearing ring arrangement as claimed in claim 13, wherein one ring part (6B) is formed by the disk (3).

16. The blade bearing ring arrangement as claimed in claim 12, wherein the profile parts (7) have a streamlined profile.

17. The blade bearing ring arrangement as claimed in claim 12, wherein the profile parts (7) project into an interior space (22) of the guide ring (6).

18. The blade bearing ring arrangement as claimed in claim 12, wherein the blade bearing ring (2) has an axial shoulder or circumferential groove (23) onto which the guide ring (6) can be plugged.

19. The blade bearing ring arrangement as claimed in claim 12, wherein the guide ring (6) can be plugged with its ring part (6B) onto the outer diameter of the disk (3).

20. The blade bearing ring arrangement as claimed in claim 12, wherein the guide ring (6) is provided with a flange (9) for clamping between the bearing housing (18) and the turbine housing (21).

* * * * *